Patented Apr. 2, 1946

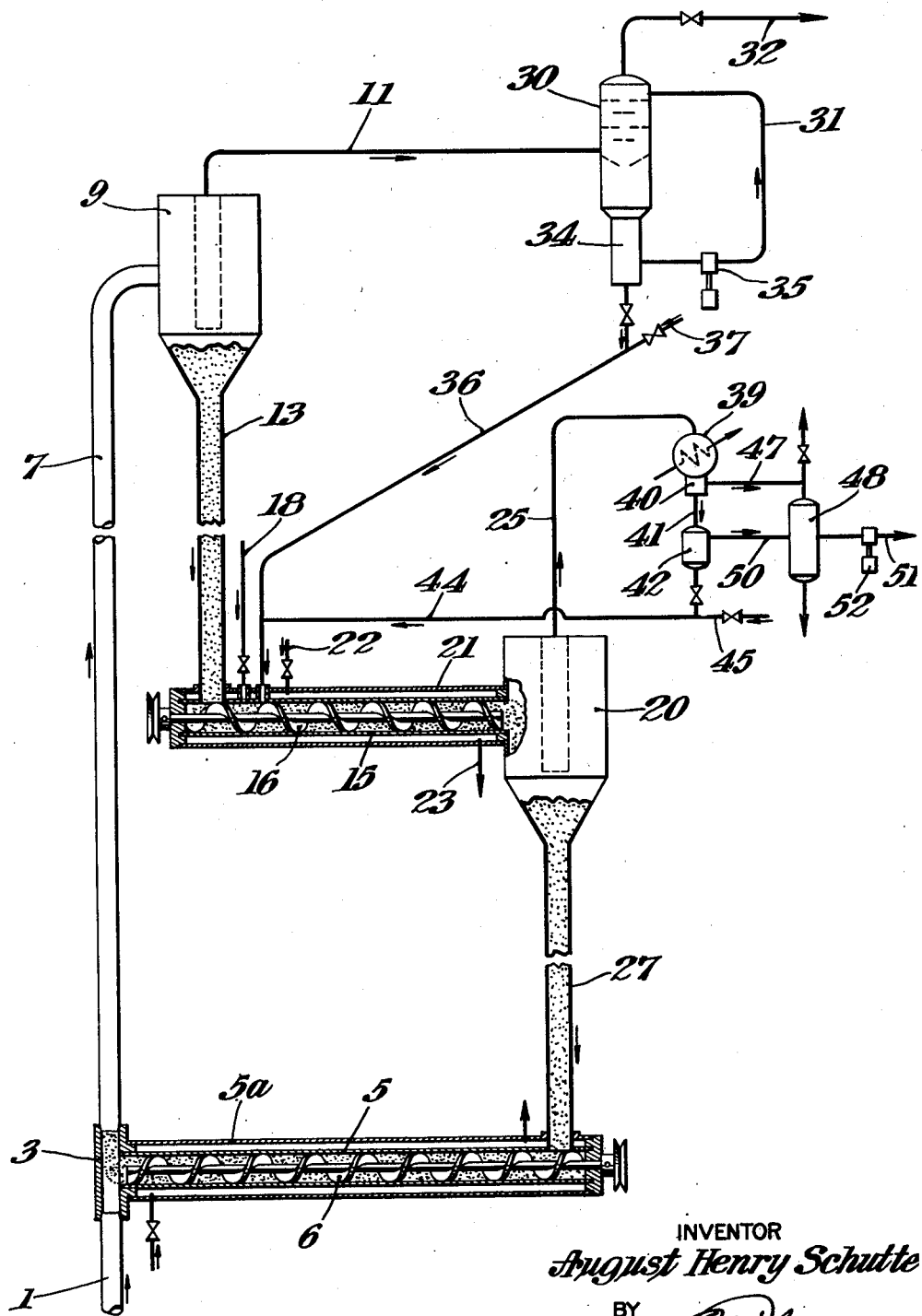

2,397,566

UNITED STATES PATENT OFFICE 2,397,566

GAS ADSORPTION

August Henry Schutte, Hastings on Hudson, N. Y., assignor to The Lummus Company, New York, N. Y., a corporation of Delaware Application September 29, 1943, Serial No. 504,275

3 Claims. (Cl. 183—4.2)

This invention relates to the adsorption of gases and particularly to a new and improved continuous gas adsorption system employing a finely divided solid adsorption material.

The principal object of this invention is to provide a continuous adsorption system employing a finely divided adsorbent material and in which system the gas adsorption zone and the adsorbent stripping zone are effectively separated from each other by non-mechanical seals which permit the maintenance of independent gaseous conditions within each zone.

A further object of this invention is to effect the separation of the finely divided adsorbent material from the lean gases in such manner that the separated adsorbent material is so confined as to form an effective gas seal preventing flow of gases therethrough, in either direction.

A still further object of this invention is to effect the separation of the stripped adsorbent material from the stripped gases in such manner as to provide a similar gas seal.

Further objects and advantages of this invention will be apparent from the following description thereof taken in connection with the accompanying drawing which is a diagrammatic illustration of a preferred form or embodiment of my improved continuous gas adsorption system employing a finely divided solid adsorbent material.

It is, of course, to be understood that this improved system is applicable to the separation of any desired gaseous component from a mixture comprising such component combined with other gaseous components and that in the following specification and claims the term "gases" is meant to include vapors.

According to my invention, a mixture of gases containing the gaseous component which is to be separated is introduced into the system through line 1, which leads to the mixer or mixing device 3. In this mixing device the gases are commingled with a suitable finely divided solid adsorbent material which is introduced thereinto from the conveyor 5, this conveyor being provided with suitable feeding means such as the screw feeding means 6 illustrated. The mixture of commingled gases and finely divided adsorbent material is passed through line 7 into the cyclone separator 9. Such conditions are maintained within the mixing device 3 and the line 7 that adsorption of the desired gaseous component from the mixture of gases takes place therein. While this adsorption may take place substantially instantaneously, nevertheless, the length of line 7 is such as to provide sufficient time for the adsorption to be fully effected, and for the adsorbent material to become substantially saturated before its delivery to the separator 9.

In separator 9 the saturated adsorbent material is effectively separated from the unadsorbed gases by the applied forces produced by the whirling action of the separator. The unadsorbed gases are removed from the top of the separator 9 through line 11 for further treatment, as hereinafter described. The separated saturated adsorbent material collects in the bottom portion of separator 9 and passes downwardly into and through the conduit 13 attached thereto. The lower end of conduit 13 discharges into conveyor 15, which conveyor is provided with suitable feeding means such as the illustrated screw feeding device 16 which withdraws the adsorbent material from the lower end of conduit 13.

The separated adsorbent material which collects in conduit 13 is compacted therein into a condensed column which is continuously moved therethrough at a rate controlled by the rate of the feeding means or screw mechanism 16. The length of conduit 13 is such that the column of compacted condensed adsorbent material contained therein provides sufficient resistance to the flow of gases therethrough as to form an effective gas or vapor seal between separator 9 and the discharge end of column 13. The rate of the screw mechanism 16 is so regulated that the height and quantity of adsorbent material necessary for this purpose is continuously maintained within conduit 13.

The separated saturated adsorbent material in the conveyor 15 is admixed with steam or other gaseous stripping medium introduced through line 18. This steam serves to strip the adsorbed gases from the adsorbent material. Sufficient steam is introduced through the line 18 to form a suspension of the finely divided adsorbent material in steam, which suspension is discharged from conveyor 15 into the cyclone separator 20. A heat exchange jacket 21 is provided for the conveyor 15 in order that suitable heat exchange or heating medium may be circulated therethrough as by means of lines 22 and 23 for the purpose of heating or otherwise controlling the temperature of the saturated adsorbent material in the conveyor in order to facilitate stripping of the adsorbed gases from the adsorbent material.

The components of the mixture of steam, stripped gases and finely divided adsorbent material delivered by the conveyor 15 are thereafter effectively separated by the applied forces produced by the whirling action of the cyclone separator 20 to which this mixture is delivered. The stripped gases are removed from the top of this separator 20 through line 25 for further treatment, as hereinafter described. The separated stripped adsorbent material is collected in the bottom of the separator 20 and passes downwardly into and through the conduit 27 extending from the lower end of the separator 20. Since conduit 27 discharges into conveyor 5, the above described feed means 6 of which returns the stripped adsorbent material to the mixing device 3, the rate of passage of the stripped adsorbent material through the conduit 27, and the rate of removal of the adsorbent material from the conduit 27 are controlled by the rate of this feeding means 6, described above.

This rate of removal of the separated stripped adsorbent material from the conduit 27 is such that the quantity of stripped adsorbent material continuously maintained therein is sufficient to form a seal effectively preventing passage of gases therethrough in either direction, between the separator 20 and the mixer or mixing device 3. As was the case in conduit 13, the separated stripped adsorbent is compacted in conduit 27 into a column so condensed that the pressure drop therethrough is sufficient to prevent any flow of gases therethrough. The rate of feed means 6 is so regulated that sufficient adsorbent material is always maintained in column 27 to form an effective gas or vapor seal.

The unadsorbed gases removed from separator 9 through line 11 are desirably passed to the scrubber 30 for recovery of any finely divided adsorbent material unseparated therefrom in the separator 9. In order to achieve this recovery of the aforesaid adsorbent material, the unadsorbed gases may be washed in scrubber 30 with a suitable wash fluid such as water, introduced into the scrubber 30 through line 31. The stripped and washed gases are removed through line 32 for disposal as desired. The wash fluid is collected in the sump 34 at the bottom of the scrubber for separation out from the wash fluid of a sludge consisting of the remaining finely divided adsorbent material. The separated wash fluid is recirculated through line 31 by the pump 35.

The sludge collected in sump 34 is preferably combined with the separated saturated adsorbent material in conveyor 15 in order to return the recovered adsorbent material to the system. For this purpose the sludge is passed through line 36 leading from sump 34 to conveyor 15 for admixture with the saturated adsorbent material therein. In order to convey the sludge through line 36, steam may be injected thereinto through line 37.

The separated stripped gases removed through line 25 from separator 20 are desirably condensed, at least partially, in condenser 39, which condenser is provided with a separator 40. The resulting condensate is passed through line 41 to the tank 42, wherein any unseparated adsorbent material is recovered as a sludge. This unseparated adsorbent material is also desirably recovered and may be returned through lines 44 and 36 to the conveyor 15 for admixture with the saturated adsorbent material therein. In order to convey the sludge through line 44, steam may be injected thereinto, for instance, through line 45.

Any uncondensed gases from the separator 40 are conveyed through line 47 to accumulator 48. The condensate which is free of sludge is also conveyed from tank 42 through line 50 to accumulator 48, from which the separated gases may be withdrawn as desired through line 51 by means of pump 52.

From the above description it will clearly appear that I have provided a continuous system in which the respective adsorption zones and stripping zones are effectively separated from each other by column seals formed of the finely divided adsorbent material employed to effect the desired gas adsorption, these seals being continuous in nature and so maintained that different gaseous conditions such as temperature, pressure and composition, may be maintained within the adsorption and stripping zones without any commingling of the gaseous contents of one zone with those of another.

While I have described this invention in connection with the adsorption of a desired gaseous component from a mixture thereof, it will be apparent that the application of this invention is not necessarily so limited. It may be applied to any continuous system wherein any desired finely divided solid compact material is commingled with a gaseous stream for any desired purpose.

It is, of course, to be understood that the above description is merely illustrative and in nowise limiting and that I intend to comprehend within this invention such modifications as are included in the scope of the following claims.

Having thus fully described my invention, what I claim and desire to secure by Letters Patent is:

1. In an apparatus for performing an adsorption process and including an adsorption zone for passage therethrough of a mixture of gases and a finely divided solid adsorbent material to adsorb one of the gases of the mixture, and a separator connected to said zone to receive therefrom and separate said material bearing the adsorbed gas and the unadsorbed gases, a relatively long vertical conduit connected at its upper end to said separator to receive from the latter the separated material and form thereof a gravity-packed column, a conveyor defining a stripping zone in receiving connection with the lower end of said conduit, means for heating the stripping zone to strip the adsorbed gas from said material, a gas washing device in receiving connection with the said separator to receive the unadsorbed gases, means to circulate a wash fluid through said device for recovery of adsorbent material borne by said gases, a delivery connection between said device and the stripping zone to pass the recovered material to the latter, a second separator connected to said conveyor to receive therefrom said material and the stripped gas and separate the material from the gas, condensing means in receiving connection with the said second separator to subject the stripped gas to a condensing operation for precipitation of adsorbent material in a condensate sludge, and a delivery connection to pass said sludge to the stripping zone, said conveyor being constructed and arranged to withdraw the gas-saturated material progressively from the lower end of said column and free the withdrawn material from the weight of the column for passage through the stripping zone, and the conveyor being operable to maintain a height of the column sufficient to form a seal preventing exchange of gas between said zones.

2. In an apparatus according to claim 1, the structure claimed in said claim and including a delivery connection for passing the separated adsorbent material from the said second separator to the adsorption zone for reuse therein, and means for cooling the separated material prior to delivery thereof to the adsorption zone.

3. In an apparatus according to claim 1, the structure claimed in said claim and including a delivery connection for passing the separated adsorbent material from the said second separator to the adsorption zone for reuse therein, and means associated with said delivery connection to cool said separated material during said passage thereof to the adsorption zone.

AUGUST HENRY SCHUTTE.